UNITED STATES PATENT OFFICE.

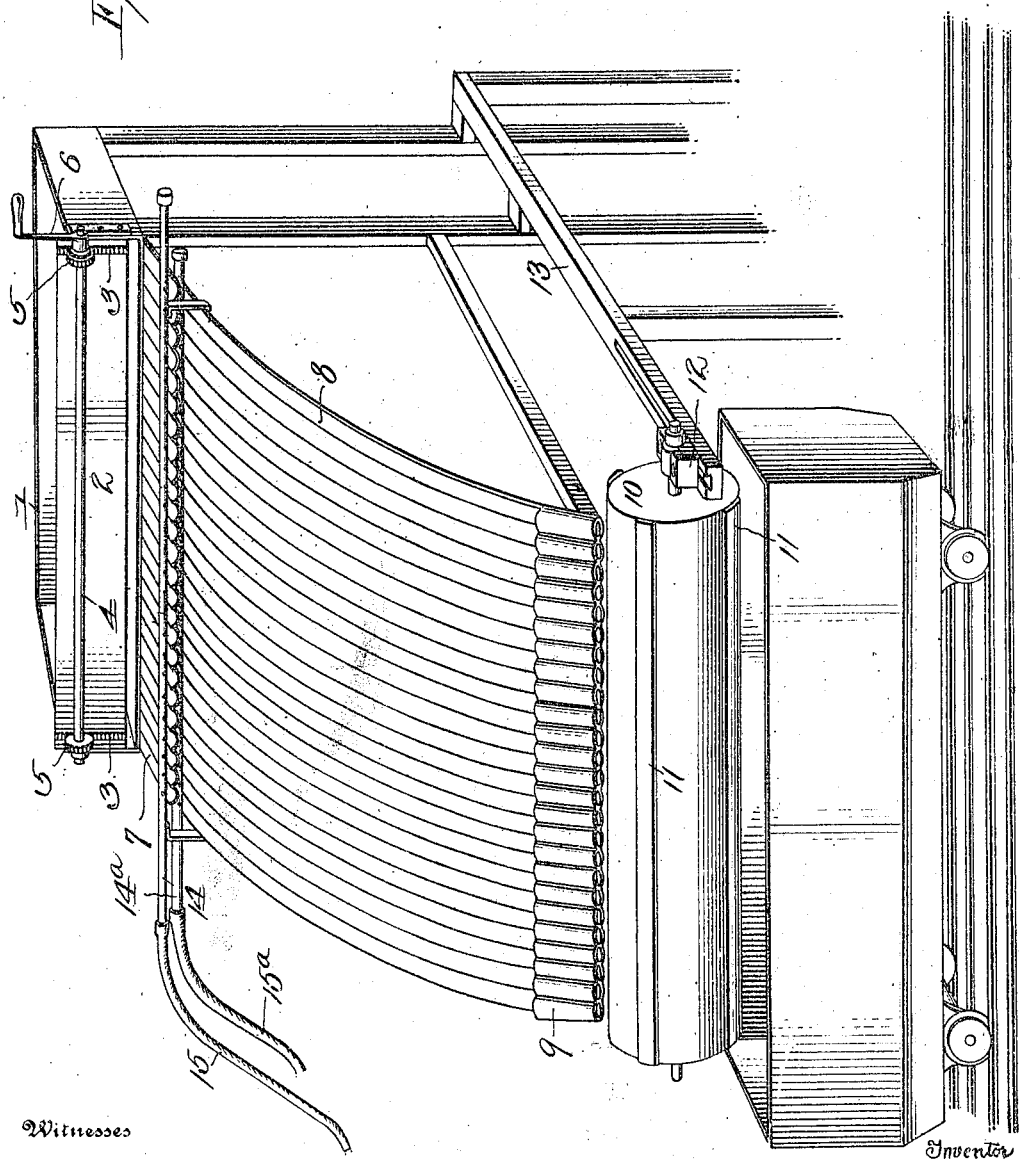

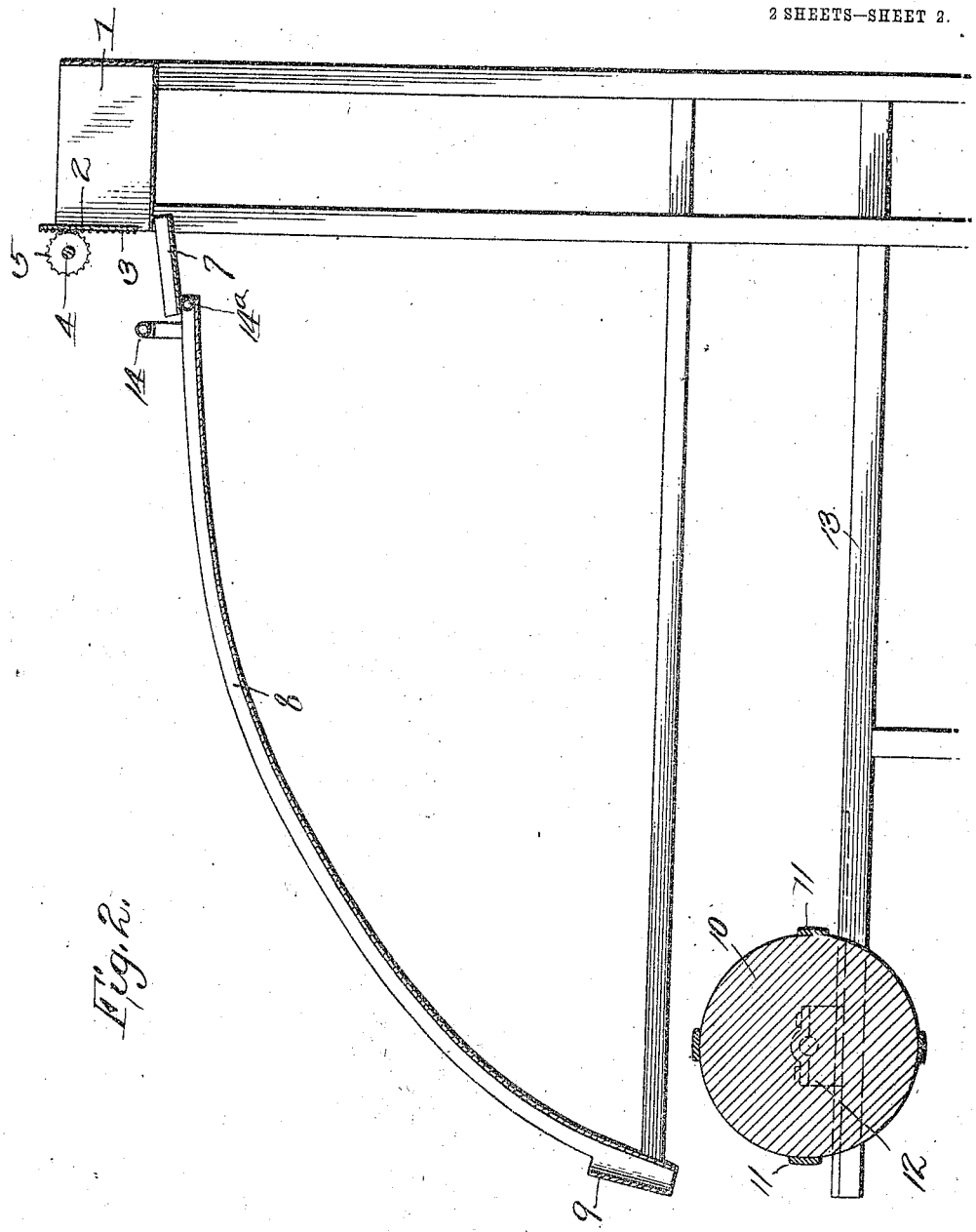

ROCKY C. GANGEWERE, OF SELMA, ALABAMA.

APPARATUS FOR TREATING SLAG.

961,602.

Specification of Letters Patent. Patented June 14, 1910.

Application filed December 2, 1909. Serial No. 531,060.

*To all whom it may concern:*

Be it known that I, ROCKY C. GANGEWERE, a citizen of the United States, residing at Selma, in the county of Dallas and State of Alabama, have invented a new and useful Improvement in Apparatus for Treating Slag, of which the following is a specification.

This invention relates to a device for treating slag for use in the manufacture of artificial blocks, or for other purposes for which a granulated or other slag may be employed.

There are many devices for treating or granulating slag which require the use of large quantities of water, thus involving considerable additional expense in drying the slag in order to render it fit for use in connection with cement, blocks, or for other purposes for which it is commonly used. There are other devices for treating the slag without adding water, but the same are expensive in construction and being complicated are not always in condition for use at the time the slag is tapped from the furnace.

The object of this invention is a simple apparatus which will prepare the slag for most of the purposes for which it is used at a minimum of expense, and with the use of such a small amount of water that it is not necessary to go to the expense of subsequently drying out the slag.

A brief description of the process employed will make more clear the use of the mechanical construction employed by me and which is the subject of this application.

As slag is tapped from the furnace it is run into a metal trough, and when the slag is to be used for brick, cement or other purposes where a certain percentage of lime is required, according to the nature of the slag and the lime is added in a pulverized or hydrated form to said slag, the latter being still in its liquid form. The slag is then run into a suitable reservoir where any metal which may remain in the same is deposited and the slag then passes to a suitable trough from which it is run over a curved longitudinal corrugated metal incline, the curvature of the incline being gradually increased, so that as the slag gradually cools it will continue to move over the surface of said incline, and will then pass from the same through suitable discharge nozzles into a car, a suitable roller at the foot of the incline keeping the slag broken to the required degree of fineness.

In the accompanying drawings: Figure 1 is a perspective view of my apparatus, and Fig. 2 is a longitudinal vertical section therethrough.

In these drawings 1 represents a trough into which the slag is run after leaving the reservoir above mentioned, which reservoir is not shown as it does not form a part of this invention. This trough is provided with a vertically movable side 2 which carries rack bars 3, and a shaft 4 arranged parallel to said side is provided with gear wheels 5 which mesh with the rack bars 3, and by turning a handle 6 the shaft can be rotated through the gears and rack bars, the side 2 being elevated, thus leaving an opening at the bottom of the desired width through which slag may pass. The slag passing from the trough 1 passes on through an incline 7 corrugated to form a large number of gutters through which the slag travels, and from these gutters, the slag falls upon a similarly corrugated curved incline 8, the curvature of which gradually increases as the foot of the incline is approached. At its lower end suitable sleeves 9 are carried by the gutters formed by corrugating or fluting the incline said sleeves forming discharge nozzles over which the cool slag is discharged over a roller 10, to a suitable car or wagon. The roller 10 may be driven in any desired manner and is provided with longitudinally extending bars 11 which strike and break the slag as it passes from the incline to the car. In order that the slag may be delivered to the car without further breaking the roller 10 is mounted in slidable bearings 12 upon a frame 13 and can be readily moved back beneath the incline and out of the way. A pipe 14 is arranged transversely above the upper portion of the curved incline 8, said pipe being suitably perforated to discharge water upon said incline, for the purpose of assisting in cooling the slag, and a supply pipe 15 leads to the pipe 14. A pipe 14<sup>a</sup> also extends across the upper end of the incline 8 and is suitably perforated and discharges water into the grooves of the incline, for the purpose of aiding in cooling the slag.

Any desired means can of course be employed for giving rotation to the roller 10.

In using the apparatus above described any suitable raking device, such as an ordinary rake may be employed for aiding movement of the slag along the grooves, such instrument being operated by hand, or in any other desired manner.

What I claim is:

1. A slag treating apparatus comprising a curved incline, the curvature of the same gradually increasing as the foot of the incline is approached, and means for feeding slag in a liquid form thereto.

2. A device for treating slag consisting of a downwardly extending gradually curved incline, longitudinally fluted, and means for discharging hot slag thereupon, the said incline having its curvature increased as the foot of the incline is approached.

3. A device for treating slag consisting of a gradually and increasingly curved and longitudinally fluted incline, discharge nozzles carried by the foot of the incline, means for discharging hot slag upon the upper portion of the incline, and a perforated water pipe extending transversely across the upper portion of said incline.

4. A device of the kind described comprising a trough, a movable side for said trough, a short incline leading from said trough, a curved incline arranged in position to receive slag from the incline first mentioned, and means for discharging a small amount of water upon the upper portion of the curved incline.

5. A device of the kind described comprising a trough, an incline leading from said trough, the said incline being curved, and being corrugated to form a plurality of parallel longitudinal gutters, sleeves carried by the foot of the incline into which said gutters lead, said sleeves forming discharge nozzles, means for regulating the feed of slag from the trough to the incline, and means for discharging a small quantity of water upon the upper portion of the incline.

ROCKY C. GANGEWERE.

Witnesses:
F. M. STILLWELL,
A. G. KAHN.